United States Patent [19]

Sunter et al.

[11] 4,026,038
[45] May 31, 1977

[54] SHIP'S MANEUVERING SIMULATOR

[75] Inventors: Lubbertus Sunter, Voorburg; Geert Jan Prins, Delft, both of Netherlands

[73] Assignee: Nederlandse Organisatie voor Toegepast Natuurwetenschappelijk Onderzoek Ten Behoeve Van Nijverheid, Handel en Verkeer, The Hague, Netherlands

[22] Filed: Apr. 5, 1976

[21] Appl. No.: 673,363

Related U.S. Application Data

[63] Continuation-in-part of Ser. No. 538,324, Jan. 3, 1975, abandoned, and a continuation-in-part of Ser. No. 372,038, June 21, 1973, abandoned.

[30] Foreign Application Priority Data

July 10, 1972 Netherlands ................. 7209572

[52] U.S. Cl. ............................. 35/10.2; 353/11
[51] Int. Cl.² ................................. G09B 9/08
[58] Field of Search .......... 35/10.2, 12 N, 12 W; 353/11–13; 73/181; 340/373

[56] References Cited

UNITED STATES PATENTS

| 3,514,871 | 6/1970 | Tucker | 35/12 N |
| 3,862,358 | 1/1975 | Wolff | 35/10.2 |
| 3,871,113 | 3/1975 | Crago et al. | 35/10.2 |

OTHER PUBLICATIONS

Van Den Brug; An Experimental Simulator for the Manoeuvring of Surface Ships; Netherlands Ship Research Centre TNO; Communication No. 185; June 1969.

Primary Examiner—Malcolm A. Morrison
Assistant Examiner—Errol A. Krass
Attorney, Agent, or Firm—Watson, Cole, Grindle & Watson

[57] ABSTRACT

A ship's maneuvering simulator comprises a wheel house of a ship having a projection screen spaced therefrom and a point light source-shadow image projector provided for the projection of a shadow image, and one or more scale models and air-water images controlled by a computer, and a projection device for the projection of a motionless part of a forepart of a ship that is visible from the wheel house. At least two plane translucent projection screens are provided that join one another at an angle, and behind each projection screen the point light source-shadow image projector is mounted such that the central position in the wheel house and the stationary point light source are positioned symmetrically with respect to this projection screen and the models provided are uniform.

3 Claims, 3 Drawing Figures

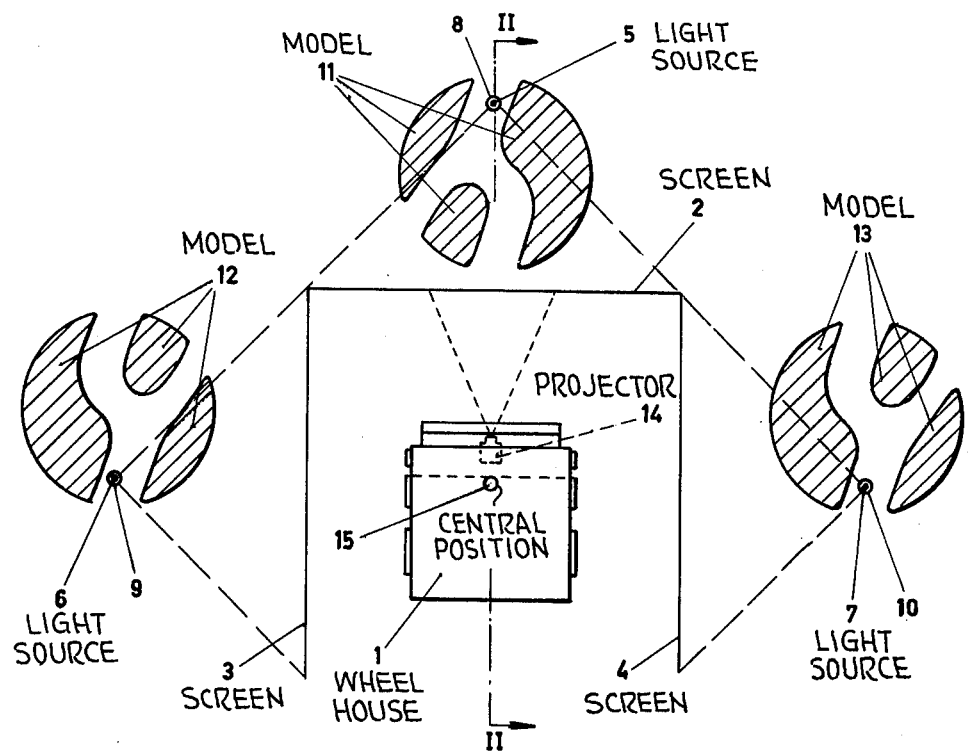
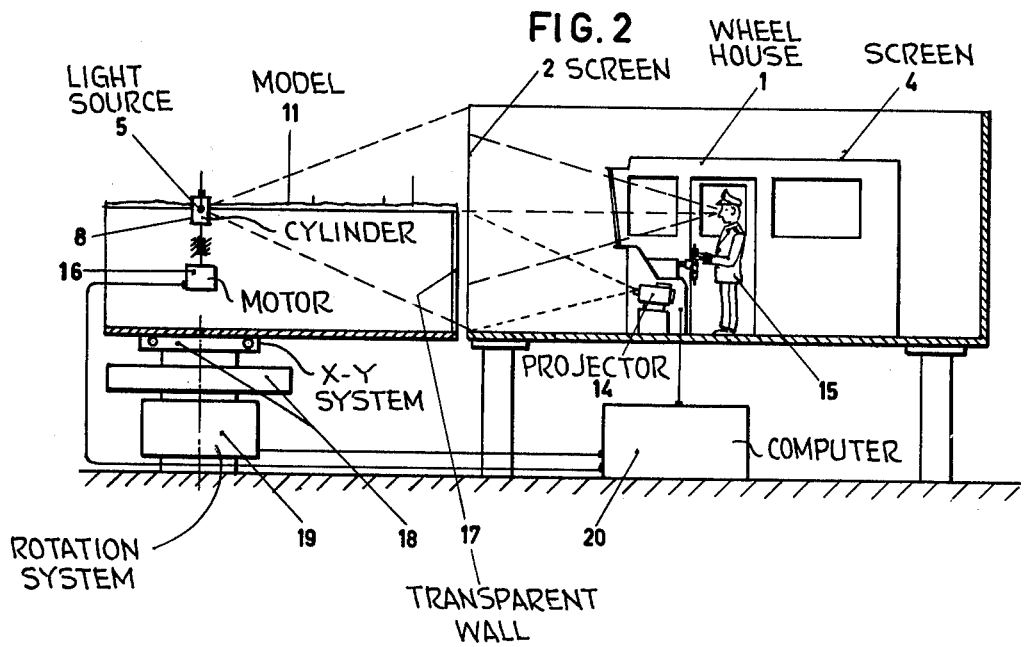

SHIP'S MANEUVERING SIMULATOR

BACKGROUND OF THE INVENTION

This application is a Continuation-In-Part of copending Ser. No. 538,324, filed Jan. 3, 1975 now abandoned as a Continuation of Ser. No. 372,038, filed June 21, 1973 and now abandoned.

This invention relates to a ship's maneuvering simulator, comprising a wheel house of a ship having a projection screen spaced therefrom, and a point light source-shadow image projector comprising a stationary point light source with which a shadow image of one or more scale models and air-water images is illuminated, such being controlled by a computer and being projected on to the projection screen, and further comprising a projection device with the aid of which a motionless image of the part of a forepart of a ship that is visible from the wheel house is projected on to the projection screen.

Maneuvering simulators for ships as above described are generally known in the art.

With the aid of the controls, reading instruments and navigation instruments normally present in a wheel house can be simulated in such a simulator for different types of ships at open sea, coastal situations, harbor situations, etc., and under outdoor influences such as, for example, wind, waves, streams and water depth.

The projection systems of the existing ship's maneuvering simulators are based on the reflecting projection method, the observer and the point light source-shadow image projector being at the same side of the projection screen. From a central position in the wheel house, being the point in which and around which the observers might be situated, the projected image always should be seen undistorted, if possible. Therefore, irrespective of the place and the shape of the projection screen the point light source must be situated as close to the central position as possible, such as over the roof of the wheel house. Since the horizon must be projected at eye level, projection is effected at an angle and is directed downwardly. As a result image distortions arise, which are greater in proportion since this angle is greater and are dependent on the shape of the screen. As the model must move alongside the plane that is delimited by the horizon on the projection screen and the point light source, effects of global curvature are omitted; this results in a very restricted space for the support and movement of the model. However, this space is determinative for the free motion of the model and consequently the size of the navigation area. Therefore, a compromise is always necessary.

In prior art simulators having a plane rectangular projection screen, vertically mounted at three meter's distance from the observer, as constructed at present, the information angle (which is the angle over which the model information is projected) in the starting position is restricted to only 42° at a constant vision angle of 110°. According to the above theory, in this construction, the model must move alongside a plane. All points of the model in this plane are projected at the correct places on the projection screen. Shadow pictures of objects that are situated perpendicular to such plane, such as towers, etc., when being elongated are passing through one point, viz. the point of intersection of the line through the point light source perpendicular to such plane and the projection screen. The resulting leaning image of the towers in the shadow picture is therefore inconvenient.

When a cylindrical projection screen is provided in a manner known in the art, a constant vision of 360° is possible. In so doing the cylindrical screen is usually mounted at 10 m from the central position. Therefore, the point light source and the horizon delimit a conical surface. Theoretically, the model must move over this conical surface which means that the model must be flexible. This is not feasible in practice. Application of a non-flexible model, however, results in the images not always being projected at the correct height with respect to the horizon.

For keeping these image distortions within acceptable limits one must therefore be content with a restricted information angle, momentarily 22.5° and capable of being extended to a maximum of 45° in the starting position and with a restricted navigation area, which, in proportion as the approach increases, becomes increasingly narrower.

It is observed that such leaning of the towers is much less disturbing on a plane projection screen than a projection of a part of a coast above or below the horizon on to a cylindrical projection screen.

The two reflecting projection systems, furthermore, have the disadvantages that it is not possible to navigate far into a harbor nor to maneuver in it.

SUMMARY OF THE INVENTION

An object of the present invention is to provide a ship's maneuvering simulator wherein image distortions are eliminated.

A further object is to extend the restricted space for the support and movement of the model.

Another object is to extend both the information angle and the vision angle.

A further object is to provide a ship's maneuvering simulator wherein it is possible to simulate navigating entirely into a harbor and maneuvering on the spot.

The invention is therefore characterized in that at least two plane abutting translucent projection screens are disposed at an angle to one another, behind each projection screen a point light source-shadow image projector being mounted in such a manner that the central position in the wheel house and the stationary point light sources are positioned symmetrically with respect to such projection screens, and the models provided are mutually uniform.

In the ship's maneuvering simulator according to the invention image distortions are excluded, because the above described condition for symmetry is met. Moreover, the restrictions resulting from the image distortions are avoided.

Furthermore, both the information angle and the vision angle can be extended up to 360° by application of more projection screens. Finally, the entire area between the projection screen and the point light source is available for movement of the model, so that the model can move over a much greater distance as compared to reflecting projection methods. This in turn results in the possibility of simulating short passing distances combined with large navigating distances, so that it has become possible with this simulator to navigate into harbors, to move within harbors and canals and to maneuver within them.

If the projection screens ae not all mounted at the same distance from the central position, the entire setup can be advantageously adapted to an available space.

In such an embodiment the scale factors of the various models can be chosen as equal or unequal. If the mutual distances of the projection screens to the central position are equal, then the models provided can be on different scales, anyhow.

It is an advantage that in an arrangement wherein the scale factors of the uniform models are equal, that the absolute values of the pertinent navigation signals be likewise equal.

When models with different scales are used, the ratio of the absolute values of the navigation signals of the rectilinear movements is determined by the ratio of the scale factors applied. This can be used with advantage in an arrangement wherein the screens are located at different distances from the central position.

It should be noted that the use of plane translucent screens for the formation of a panoramic image is known in the art. It is self-evident that within the scope of the invention the ship's maneuvering simulator described above can be constructed for the simulation of the navigation of other means of traffic. The shadow imaged projected can be completed with additional projected images obtained in a different way, such as projected film images and projected television images.

Within the circumference of the projected stationary image of the forepart of the ship, additional moving images, for instance activities on the deck, may also be projected.

BRIEF DESCRIPTION OF THE DRAWINGS

The invention will be further described with reference to the drawing in which an embodiment of the invention is schematically shown.

FIG. 1 is a vertical elevational view partly in section, of a ship's maneuvering simulator in accordance with the invention;

FIG. 2 is a sectional view taken along line II—II of FIG. 1; and

Figure 3:
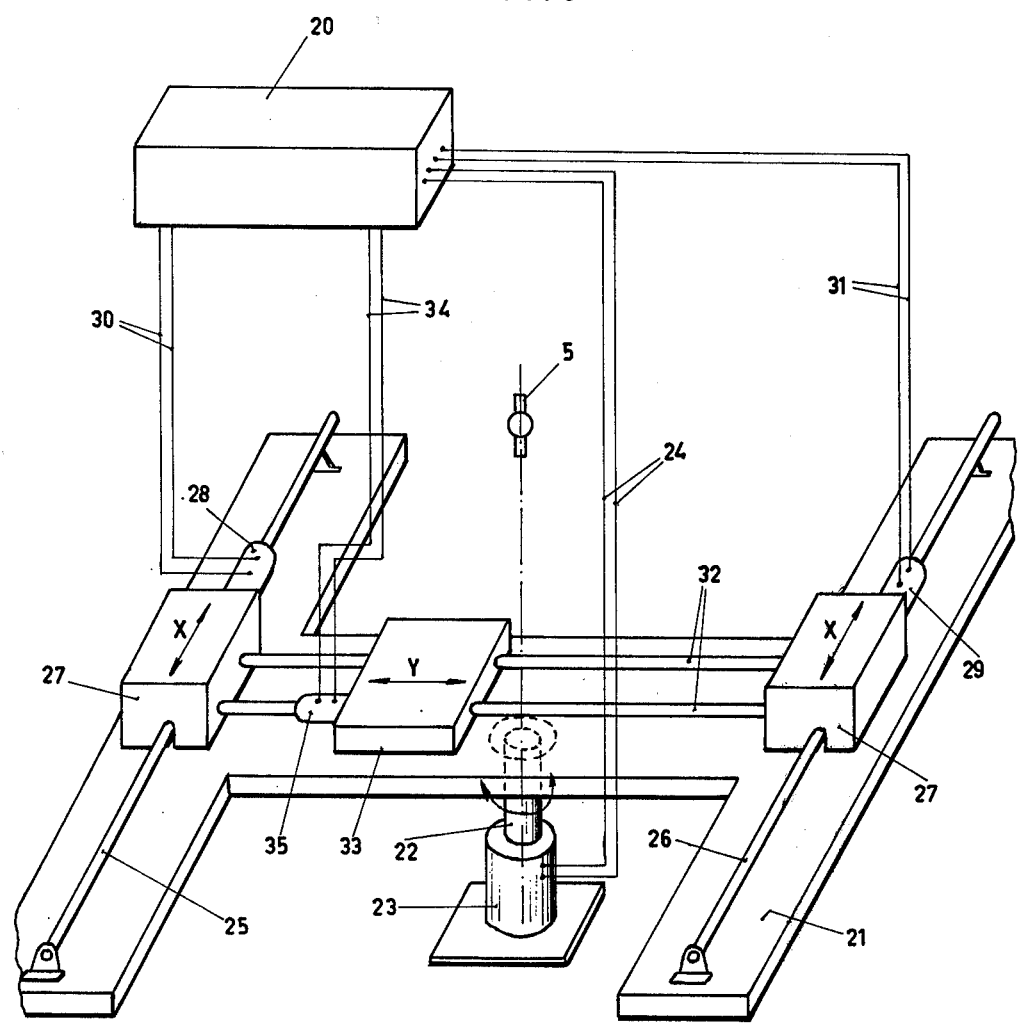
FIG. 3 is a diagrammatic perspective view of a moving system for the models.

The ship's maneuvering simulator shown in FIG. 1 comprises a wheel house 1 surrounded by three translucent projection screens 2, 3 and 4, screens 2, 3 and 2, 4 abutting one another at angles of 90° thereby providing for a panoramic image of 270°. Stationary point light sources 5, 6 and 7 are respectively located behind each screen with the distance between each point light source and its respective projection screen being equal to the distance from the projection screen to a central position 15 in wheel house 1.

The distances between point light sources 5, 6 and 5, 7 are therefore respectively equal.

Surrounding point light sources 5, 6 and 7 are respective vertical cylinders 8, 9 and 10 of a transparent material each having an air-water image thereon, and each cylinder being rotatably mounted in place.

Models 11, 12 and 13 are respectively located on a horizontal plane passing through each point light source of each projector, each such model being movable along $x$ and $y$ axes of its horizontal plane and each being rotatable about a shaft whose central axis is perpendicular to such plane and extends through its respective point light source.

A projector 14 is provided for projecting an image onto screen 2 and visible from wheel house 1 of a part of a forepart of a ship.

Arrangement of the various devices described above are diagrammatically shown in FIG. 2.

Vertical cylinder 8 is rotated by an electromotor 16. Model 11 is supported on a wall 17 made of a transparent material which can be moved along $x$ and $y$ axes by means of a $x-y$ moving-system 18 known in the art and schematically shown in FIG. 2, and can be rotated by means of a rotational system 19.

Cylinders 9 and 10 are similarly rotated and models 12 and 13 are similarly supported for movement and rotation, although not shown in FIG. 2.

All movements of cylinders 8, 9 and 10 and of models 11, 12 and 13 are controlled by a computer 20.

FIG. 3 illustrates a typical means for moving and rotating each model, which means forms no part of the invention and which is well known to those skilled in the shadowgraph art.

A rotatable platform 21 with the rotation axis through the point light source 5 is provided on which the $x-y$ moving means rest. The rotatable platform being secured to a rotatable shaft 22 of rotational system 19 which comprises an electromotor 23 controlled from computer 20 via line 24. On the rotatable platform 21 two parallel shafts 25 and 26 make provision for the guiding of the carriage 27 of the $x$-movement.

Two servomotors 28 and 29 controlled via lines 30 and 31 are controlled from computer 20. On the $x$-carriage two parallel shafts 32 make provision for the guiding of the carriage 33 of the $y$-movement. The computer 20 controls via a line 34 servomotor 35. On the $y$-carriage 33 support 17 of the model 11 rests (see FIG. 2).

The components of the ships movements along a coordinate system fixed to the earth are, taking into account the scale factor and the sign, represented by the $x$ and $y$ movements of carriages 27 and 33 respectively. The course movement of the ship corresponds with the rotational movement of the system.

Movement of the other models 12 and 13 is controlled in a similar manner by computer 20 as outlined above, such that the positions of cylinders 9 and 10 in models 12 and 13 respectively are always in the same position regarding their models as cylinder 8 is in model 11.

Computer 20 is of a type well known in the art and can be a digital, an analog or a hybrid computer. This computer 20 solves continuously and in real time the equations of "motion" of the ship and controls with its output signals the movements of the rotatable platform 21 and that of the $x$- and $y$-carriages which correlate with the ship movements. The indicators in the instrument consoles in the wheelhouse are controlled in the same manner. The input signals to the computer 20 come from the steering wheel and the selected telegraph position which change corresponding with the captains orders. By choosing the right equations of "motion" any ship can be simulated. The operation of the computer is well known to those skilled in the art of ship simulation and therefore not elucidated in detail.

Obviously, many modifications and variations of the present invention are made possible in the light of the above teachings. It is therefore to be understood that within the scope of the appppended claims the invention may be practiced otherwise than as specifically described.

What is claimed is:

1. A maneuvering simulator, comprising a ship wheel house having a central point location therein, at least two abutting translucent projection screens disposed at an angle to one another and located at a distance from said wheel house, each of said screens having an inner surface and an outer surface a stationary point light source located at a distance behind each said screen, models of coastal terrains associated with said point light sources, each model having a scale factor; means cooperating with each said point light source for effecting the projection of air/water shadow images therefrom onto the outer surfaces of said screens, means for moving said cooperating means and said models, a computer for controlling the movement of said moving means, and a projection device for projecting a motionless image of a portion of a forepart of a ship onto the inner surface of one of said screens, said models being mutually uniform, and said point light sources and said central point being symmetrically disposed relative to said screens, and the mutual relative distances between said sources and said central point being such that the shadow images projected onto the outer surfaces of said screens together form a panoramic view with respect to said central point.

2. The simulator according to claim 1, wherein said screens are each located at an equal distance from said central point, the scale factors of said models being mutually equal and said control means effects an equal rate of movement of said models and said cooperating means.

3. The simulator according to claim 1, wherein said screens are each located at a different distance from said central point, the scale factors of said models being different and said control means effects different rates of movement of said models and said cooperating means in accordance with the ratio of said different scale factors.

* * * * *